United States Patent [19]

Webb

[11] Patent Number: 5,828,695
[45] Date of Patent: Oct. 27, 1998

[54] QAM SYSTEM IN WHICH THE CONSTELLATION IS MODIFIED IN ACCORDANCE WITH CHANNEL QUALITY

[75] Inventor: William Timothy Webb, Southampton, England

[73] Assignee: British Telecommunications public limited company, London, England

[21] Appl. No.: 162,016
[22] PCT Filed: Jun. 2, 1992
[86] PCT No.: PCT/GB92/00988
§ 371 Date: Feb. 18, 1994
§ 102(e) Date: Feb. 18, 1994
[87] PCT Pub. No.: WO92/22162
PCT Pub. Date: Dec. 10, 1992

[30] Foreign Application Priority Data

Jun. 3, 1991 [GB] United Kingdom .................. 9111856
Jul. 5, 1991 [GB] United Kingdom .................. 9114556

[51] Int. Cl.⁶ .............................. H04B 1/38; H04B 1/40
[52] U.S. Cl. .......................... 375/219; 375/221; 375/228; 455/88
[58] Field of Search ................... 375/224, 261, 375/286, 293, 377, 265, 262, 235, 220, 219, 221, 228; 455/73, 88

[56] References Cited

U.S. PATENT DOCUMENTS

| | | | |
|---|---|---|---|
| 4,462,105 | 7/1984 | Wagner et al. | 375/8 |
| 4,495,619 | 1/1985 | Acampora | 370/104 |
| 4,677,625 | 6/1987 | Betts et al. | 371/43 |
| 4,780,883 | 10/1988 | O'Connor et al. | 375/7 |
| 4,797,898 | 1/1989 | Martinez | 375/7 |
| 4,852,090 | 7/1989 | Borth | 370/104 |
| 4,888,792 | 12/1989 | Yagi et al. | 375/39 |
| 4,899,367 | 2/1990 | Sampei | 375/39 |
| 4,903,324 | 2/1990 | Warnagiris | 455/69 |
| 4,937,844 | 6/1990 | Kao | 375/122 |
| 4,945,549 | 7/1990 | Simon et al. | 375/53 |
| 4,956,851 | 9/1990 | Wolensky et al. | 375/222 |
| 5,054,036 | 10/1991 | Brownlie et al. | 375/27 |
| 5,063,571 | 11/1991 | Vancraeynest | 375/200 |
| 5,117,423 | 5/1992 | Shepherd et al. | 370/95.1 |
| 5,123,008 | 6/1992 | Beesley | 370/29 |
| 5,134,635 | 7/1992 | Hong et al. | 375/94 |
| 5,150,384 | 9/1992 | Cahill | 375/97 |
| 5,170,413 | 12/1992 | Hess et al. | 375/38 |
| 5,210,770 | 5/1993 | Rice | 375/200 |
| 5,222,247 | 6/1993 | Breeden | 455/26.1 |
| 5,233,629 | 8/1993 | Paik et al. | 375/39 |
| 5,263,052 | 11/1993 | Borth et al. | 375/39 |
| 5,276,686 | 1/1994 | Ito | 370/95.1 |
| 5,282,222 | 1/1994 | Fattouche et al. | 375/1 |
| 5,289,459 | 2/1994 | Browlie | 370/17 |
| 5,363,408 | 11/1994 | Paik et al. | 375/39 |

FOREIGN PATENT DOCUMENTS 0154565 9/1985 European Pat. Off.

OTHER PUBLICATIONS

Proceedings of the 1988 IEEE Military Communications Conference, 23–26 Oct. 1988, San Diego, pp. 933–937.
IBM Technical Disclosure Bulletin, vol. 23, No. 2, Jul. 1980, pp. 641–643.
Wireless 90, Jul. 16–17, 1990, Marlborough Inn, Calgary, Alberta, Canada "Deploying Peronsal Communication Networks" by Raymond Steele, pp. 1–8.

*Primary Examiner*—Edward L. Coles
*Assistant Examiner*—Madeleine AV Nguyen
*Attorney, Agent, or Firm*—Nixon & Vanderhye P.C.

[57] ABSTRACT

A radio system is so designed as to allow each of a pair of transceivers to assess the quality of the link, and to modify the signal constellation accordingly. Each transceiver monitors the quality of the channel by assessing the strength of the received signal, or the bit error rate, or both. The system is specifically adapted to time division duplex (TDD) transmission over fast fading channel. In each block of data, the first bit is a QPSK (4QAM) signal, which indicates which constellation is to be used.

11 Claims, 6 Drawing Sheets

Fig.1.

THE FRAMING STRUCTURE USED IN THE VARIABLE LEVEL SCHEME

Fig.6.

BER COMPARISON OF VARIABLE AND FIXED SYSTEM

Fig. 2.

SOME QAM CONSTELLATIONS USED IN THE VARIABLE LEVEL SCHEME

Fig.4.

EXAMPLE OF RSSI SWITCHING FOR VARIABLE BIT RATE RSSI SWITCHING SYSTEM

Fig.5.

EXAMPLE OF RSSI SWITCHING FOR CONSTANT BIT RATE RSSI SWITCHING SYSTEM

EXAMPLE OF BER SWITCHING
BER SWITCHING SYSTEM

Fig. 9.

PERFORMANCE IN A DECT-LIKE SYSTEM

QAM SYSTEM IN WHICH THE CONSTELLATION IS MODIFIED IN ACCORDANCE WITH CHANNEL QUALITY

FIELD OF THE INVENTION

The present invention relates to a radio system, and in particular, though not exclusively, to a radio system for mobile radio using Quadrature Amplitude Modulation (QAM) as a modulation scheme.

BACKGROUND OF THE INVENTION

QAM transmissions over Rayleigh fading mobile radio channels are subjected to error bursts due to deep fades, even when the channel signal-to-noise ratio (SNR) is high. This leads to the notion of varying the number of modulation levels according to the integrity of the channel, so that when the transmissions are not subject to fading the number of modulations levels could be increased by increasing the number of QAM constellation points, and when fading occurs the number of constellation points could be reduced to a value which provides an acceptable bit error rate (BER). If the required BER and switch levels are specified accordingly, variable data throughput results. Alternatively, if throughput is kept reasonably constant a variable BER is obtained.

One approach, known from U.S. Pat. No. 4,495,619 (Acampora), is to have a variable rate system and some method of informing the transmitter at one end of the radio link of the quality of the link as perceived by the receiver at the other end of the link. The transmitter can then respond by changing the number of QAM levels according to the quality criteria adopted. Successful variable rate transmission requires that the fast fading channel changes slowly compared to a number of symbol periods. If this condition is not met, then the frequent transmission of quality control information will significantly increase the bandwidth requirements of the system.

SUMMARY OF THE INVENTION

The present invention seeks to provide a radio system in which transmissions are adapted to transmission conditions.

According to a first aspect the invention provides a radio system comprising a pair of stations at least one of which has a radio transceiver having:

a radio receiver for receiving signals from the other station;

means for assessing the received radio signals;

means for selecting a transmission modulation state on the basis of the assessment of the received signals;

a radio transmitter for transmitting signals to the other station using a modulation scheme having a plurality of modulation states;

means for adjusting the transmitting state of the radio transmitter to be the selected modulation state; and signalling means for including in the signals to be transmitted to the other station an indication of the selected modulation state.

According to a second aspect the invention provides a radio transceiver for the transmission of digital signals characterised in that the number of binary digits encoded onto each symbol for transmission is varied according to measured received signal strength, the measured bit error rate (BER) or some combination of these.

According to a third aspect the invention provides a radio transceiver characterised in that the received signal strength is averaged over a predetermined time period and the number of bits/symbols to be used in forthcoming transmissions is determined according to this average.

According to a fourth aspect the invention provides a radio transceiver characterised in that errors in received decoded digital signals are identified using an error detection system, and the number of bits/symbol to be used in forthcoming transmissions is based on the number and distribution of the errors detected.

In radio systems wherein the radio communication is bi-directional but instantaneously uni-directional, the data being placed in packets or blocks, the initial symbols in each block may be reserved for signalling the number of bits/symbol to be used in the block.

According to a fifth aspect the invention provides a a mobile radio system for operation over radio channels with fast fading wherein the number of modulation levels is varied at a rate commensurate with the fast fading.

According to a sixth aspect the invention provides a radio transceiver comprising:

a radio receiver for receiving radio signals;

means for assessing the received radio signals;

means for selecting a transmission modulation state on the basis of the assessment of the received signals;

a radio transmitter for transmitting signals using a modulation scheme having a plurality of modulation states;

means for adjusting the transmitting state of the radio transmitter to be the selected modulation state; and signalling means for including in the signals to be transmitted an indication of the selected modulation state.

To reduce the problem of fast fading the data rate could be increased, allowing the transmission of more symbols before the channel changes significantly. The slower the mobile travels, the slower the fading rate and the lower the signalling rate required for adapting to the channel.

Varying the number of QAM levels in response to fading conditions can result in a variable bit rate, which although nearly constant over long periods, could instantaneously vary by four times the average rate. Consequently, it is appropriate to consider strategies for using adaptive or multi-level QAM, while transmitting data rather than speech. Data transmissions often have the virtue that a variable throughput, and relatively large delays, can be tolerated provided the BER is sufficiently low. For fully successful computer file transfer the BER must be zero.

BRIEF DESCRIPTION OF THE DRAWINGS

Preferred embodiments of the invention will now be described by way of example, and with reference to the accompanying drawings, wherein.

DETAILED DESCRIPTION OF THE DRAWINGS

Figure 1:
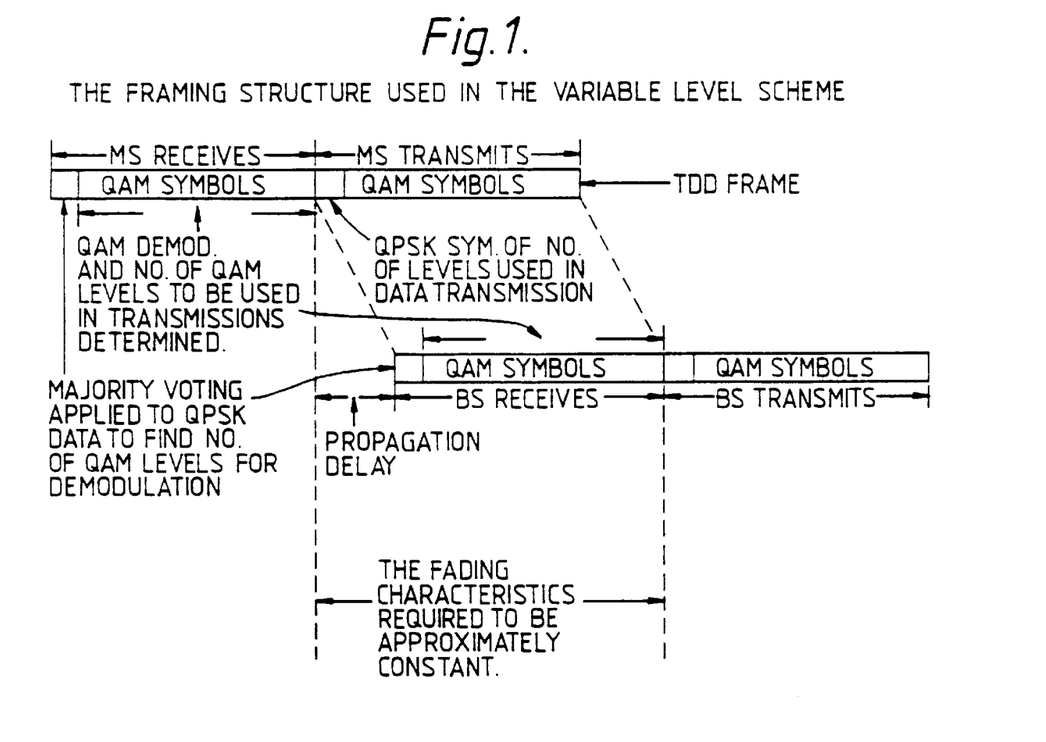
FIG. 1 illustrates schematically a framing structure for use with a variable level QAM scheme.
Figure 2:
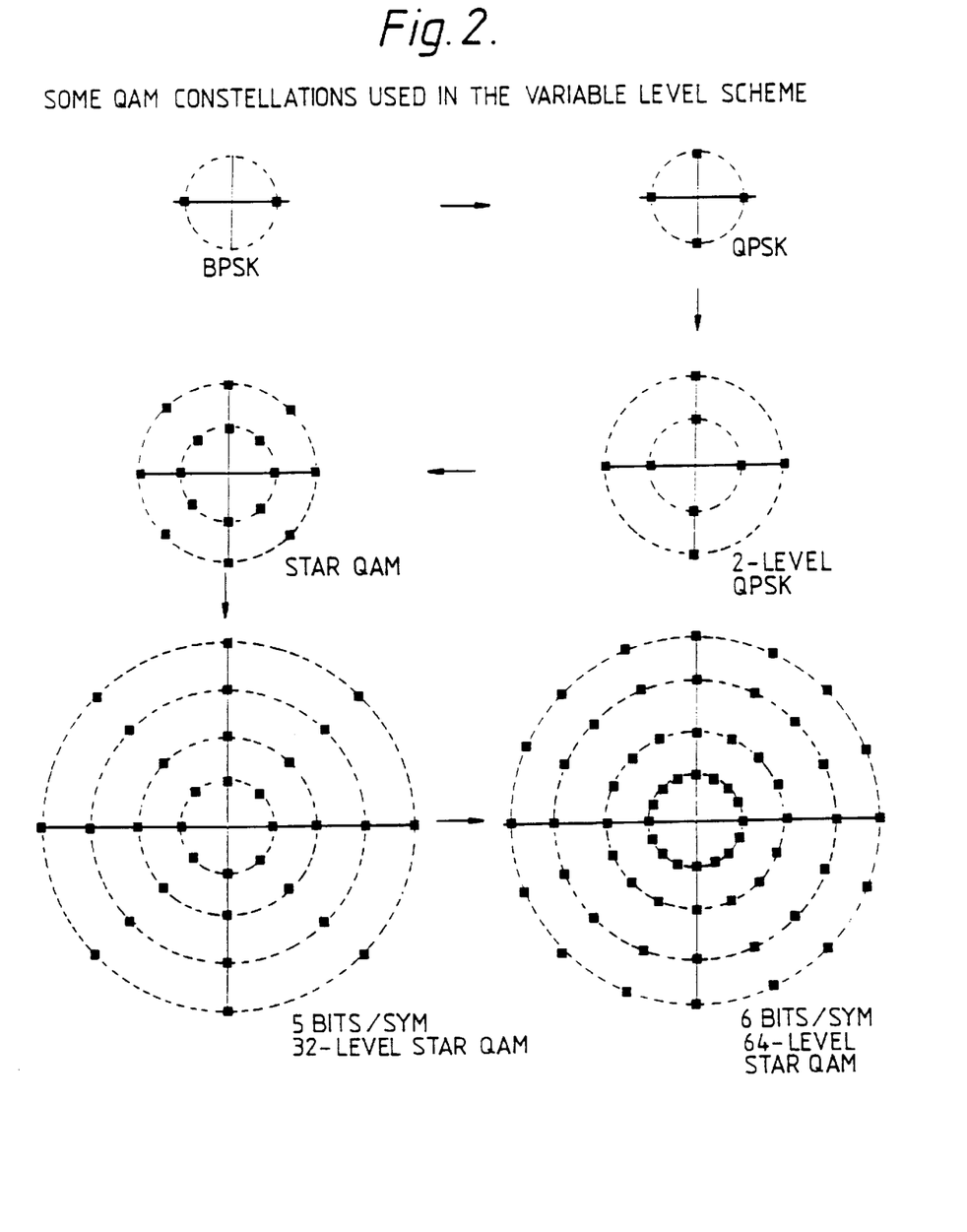
FIG. 2 illustrates a series of QAM constellations for use in a variable level QAM scheme.

The simplest duplex arrangement for variable rate modem operation is Time Division Duplex (TDD), where both Base Station (BS) and Mobile Station (MS) transmit over the same channel, but at different times. In this case both the BS and the MS experience similar channel fading conditions as their transmissions are typically half a TDD frame apart. The transmission received by the MS is used to estimate the channel integrity which then dictates the number of QAM levels to be used by the MS transmitter. Similarly, the transmission received by the BS enables the number of QAM levels to be used in the subsequent BS transmission to be determined. Both the BS and MS should inform the other of the number of QAM levels used by their transmitters and this information should not be corrupted by the channel, in order for the QAM demodulations to be properly performed. In simulations data was divided into blocks, or packets that occupy a time slot and the first few symbols in each block are reserved for signalling. The optimum size of the block is related to the mobile speed as the channel should not chance significantly over the block duration. Blocks of 100 symbols were used for transmissions at 512 kSym/s, a mobile speed of 30 mph and a carrier frequency of 1.9 GHz. At the start of each block a signal was sent representing the number of levels to be used in the block. This was encoded onto two symbols of a 4-level QAM, i.e., QPSK system, and each of these two symbols was transmitted three times. Majority voting was performed at the receiver in order to establish the number of QAM levels to demodulate in the current block. With larger block sizes, higher integrity codes can be used on the information containing the number of levels without significantly reducing the throughput. FIG. 1 shows the TDD framing arrangement for adaptive QAM transmissions using one carrier per channel. If N channels per carrier are used the QAM symbols shown in the Figure are transmitted N times faster, but the time over which the fading channel must remain essentially unchanged is the same, i.e. on the basis that the cells are sufficiently small for flat Rayleigh fading to apply. The QAM constellation changes as the number of levels is varied. Conventional QAM having a square constellation are not used because of the difficulties with carrier recovery in a fading environment. Instead Star QAM having a circular star constellation is used, in conjunction with differential coding, as this has proved to be more successful in previous simulations. The principle of Star QAM is to provide a constellation upon which differential coding can be efficiently overlaid. Both differential phase and amplitude coding is used. With 16-level Star QAM three of the four bits which constitute a symbol are differentially Gray encoded onto the phase, and the remaining bit is differentially encoded onto the amplitude of the phasor. This simplifies the receiver as AGC and carrier recovery are no longer required. Simulations have shown that BER performance is substantially improved over the square constellation whose receiver has the difficulty of accurately estimating the absolute signal phase and amplitude when both are varied randomly by the modulator and both are also influenced by the rapidly changing Rayleigh fading propagation channel. Star QAM has the further advantage over Square QAM that each of the four bits constituting a symbol has a similar BER, making speech and data mapping straightforward. This is not the case for Square QAM where half of the bits mapped onto a 16-level grey-coded constellation have a significantly higher BER than the other half. In simulations constellations from 1 bit/sym (BPSK) through to 6 bits/sym were used. Provided the receiver noise is sufficiently low, and implementation complexity is not an inhibiting factor, more than 6 bits/sym can be used. As the number of bits/sym is increased the number of amplitude rings and the number of phase points is alternately doubled. Starting with BPSK, for 2 bits/sym the number of phase points is doubled to get QPSK. For 3 bits/sym the number of amplitude levels is doubled to get 2-level QPSK. For 4 bits/sym the number of phase points is doubled to get to the 16-level Star constellation, and so on until with 6 bits/sym 4 rings having 16 points per ring. The constellations for 2-level to 64-level Star QAM are shown in FIG. 2. The actual distances between the rings, and the sizes of the rings are not drawn to scale. Each constellation has the same average energy, and the radii of the rings in the 8 and 16-level constellations are in the ratio of three-to-one.

The differential encoding is correctly initiated by using the convention that the point before the first data symbol is sent on the innermost amplitude ring at 0 degrees, and we then calculate our differentially encoded data from this phasor.

Figure 3:
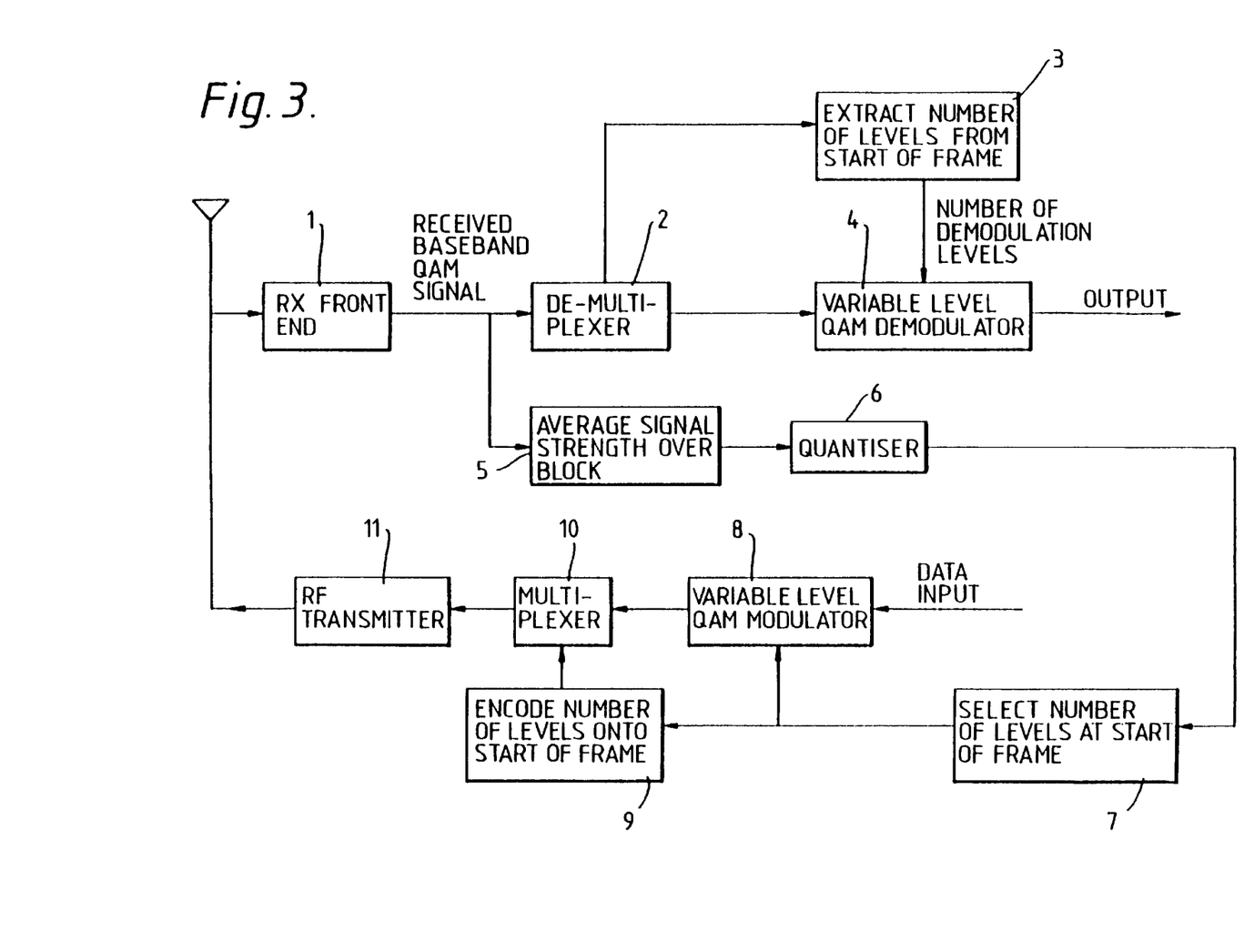
FIG. 3 illustrates a radio transceiver of a preferred embodiment of the invention.

The block diagram of a transceiver is shown in FIG. 3. After recovering the baseband signal by receiver (RX) front end 1, demultiplexing is performed by de-muitiplexer 2 to separate the QPSK and Star QAM signals. QPSK demodulation is performed by QPSK demodulator 3 to obtain the number of QAM levels to be used in the QAM demodulation. This is followed by QAM demodulation by QAM demodulator 4 to yield the recovered data. The average magnitude of the baseband signal level over a block is measured by average monitoring unit 5 to provide an indication of the short-term path loss of the radio channel. If this average is very low the mobile is either in a deep fade or at the edge of the cell. In either case it is more appropriate for it to transmit using relatively few QAM levels. Conversely, if the average is high the channel is relatively good, enabling more QAM levels to be used in its next transmission. The average over a block is computed using an exponential smoothing process which gave more weight to signal levels towards the end of the block. This average is quantised by quantiser 6, each quantised output signifying a particular number of QAM levels to be used in the forthcoming transmission.

In the transmitter part of the transceiver of FIG. 3, the output of quantiser 6 is fed to a level selection unit 7. The level selection unit 7 controls a variable level QAM modulator 8 to modulate a data input stream. The level selection unit 7 also controls a level encoding unit 9 which encode the selected QAM level into the start of frame. Outputs from QAM modulator 8 and level encoding unit 9 are fed to a multipiexer 10, and multiplexer 10 feeds an RF transmitter unit 11.

The baseband signal in FIG. 3 is related to the received signal strength indicator (RSSI) at RF. The system would function identically if the RF RSSI, instead of the baseband RSSI indicator, was averaged over a block. For ease of nomenclature, this method of switching the QAM levels based on the baseband signals is called baseband RSSI switching, or more simply, RSSI switching.

Figure 4:
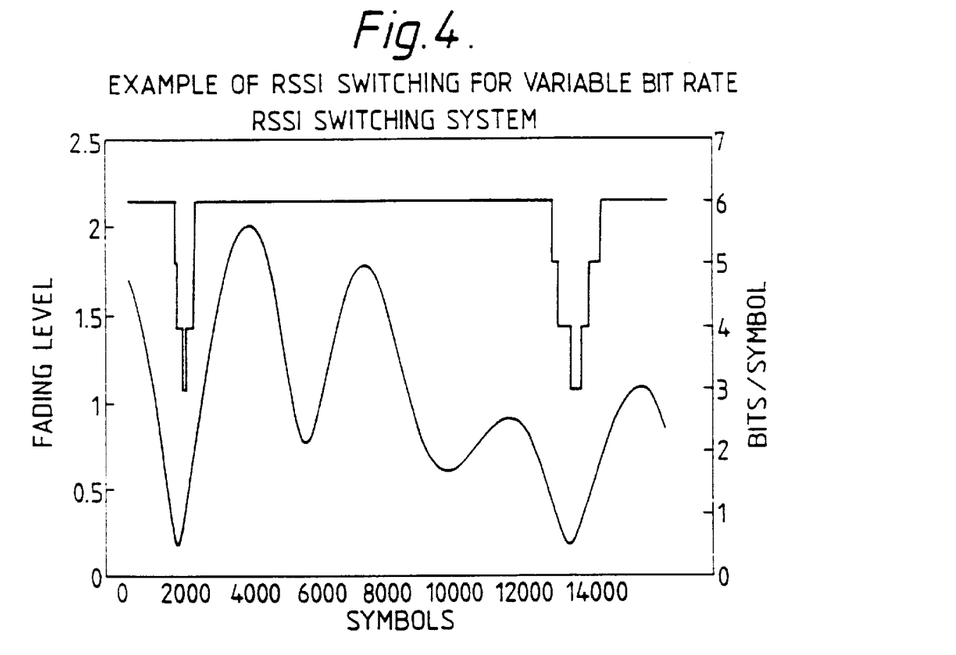
FIG. 4 shows a graph illustrating the variation of bits/symbol with fading level.

Two criteria are used for these switching levels, i.e. the levels generated by the quantiser in FIG. 3. One is to select the switching levels to achieve a specified BER, resulting in a variable data throughput. A simulation was conducted where graphs of BER as a function of SNR at the input to the QAM demodulator were found for the Star QAM modem having $2^n$; n=1, 2, . . . 6 fixed levels. In this simulation a Gaussian channel was used, as over any short period of time when we do our switching the channel is essentially a constant level plus Gaussian noise. A straight line corresponding to the BER of interest was then drawn and where this horizontal line intersected the curves identified the switching thresholds. The SNR was therefore quantised, with the quantisation zones corresponding to different number of QAM levels in the adaptive modem. Some hysteresis was built into the switching levels to prevent continual level changing. The baseband signals in FIG. 3 are contaminated by noise, which the averaging circuit considerably reduces prior to QAM level selection at the end of the block. To ensure that the quantiser output levels correspond to the required SNR values, the average value of the QAM symbols (found at the end of the block) was appropriately scaled by the known receiver noise prior to qauantisation. FIG. 4 shows an arbitrary segment of the signal applied to the QAM demodulator, and the number of bits/sym selected during this period. The figure was produced from a simulation at 30 dB with other parameters as stated previously. Because of the relatively high SNR, much of the time the modem attained its maximum 6 bits/sym.

Figure 5:
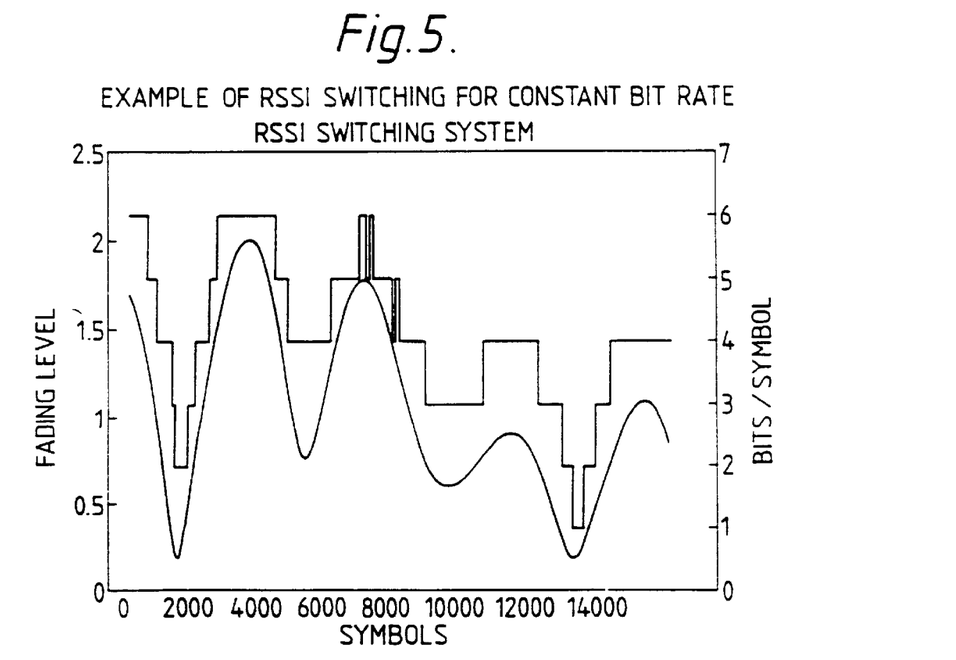
FIG. 5 shows a graph illustrating the variation of bits/symbol with fading level.

The second criteria for choosing the switching thresholds achieved a constant average bit rate whilst accepting a variable BER. Here the thresholds derived above were used for the constant BER system and these were multiplied by the same number at the start of each block. This number was derived from the baseband signal averaged over a number of fades. This merely involved adding an extra averaging circuit with the averaging window increased over that used to average over a block in FIG. 3, so that it covered many blocks. Therefore as the average signal level rose, for example when moving closer to the base station, the switching thresholds increased accordingly maintaining a near constant average throughput, but variable BER. The average bits/sym could be set to any level within the maximum number of bits/sym by changing the scaling factor associated with the long term average input. Where the average bit rate was the same for both selection criteria, they both gave identical BERs, and can be viewed as equivalent systems. FIG. 5 shows switching profiles for this constant throughput scheme over the same section of fading channel as for the previous profile. Again an SNR of 30 dB is used. Here there is considerably more level changing in an effort to keep the average to 4 bits/sym. If a lower SNR had been chosen for both graphs then they would appear more similar.

Channel coding can be added to both the above systems, in our case in the form of systematic BCH codes. The data was encoded and interleaved over 15,600 bits before being passed to the input of the QAM modulator in FIG. 3. At the output of the demodulator de-interleaving was performed in an attempt to randomize the bursty channel errors before channel decoding takes place. The variable QAM schemes have the advantage over the fixed QAM scheme that errors occurred in smaller blocks because of the use of fewer QAM levels in poor channels. This allows the channel codecs to perform more efficiently. The performance of the RSSI switching system with channel coding is considered below.

Figure 6:
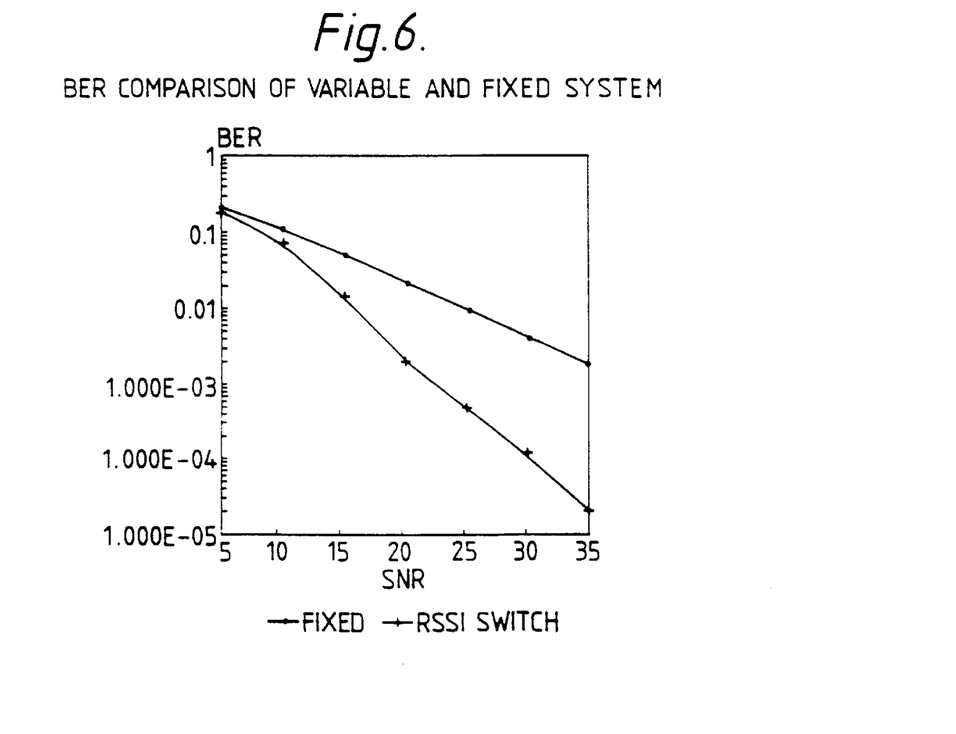
FIG. 6 shows a graph illustrating comparative BER for fixed and variable modulation schemes.

The performance of the RSSI switched variable level Star QAM system compared to a fixed 16-level (4 bits/sym) Star QAM system is shown in FIG. 6. The adaptive QAM system has had its switching thresholds adjusted to also give 4 bits/sym. The necessary signalling information of the number of QAM levels used has been taken into account in calculating this throughput. The simulation was performed for a propagation frequency of 1.9 GHz, a vehicular speed of 30 mph, and a transmitted symbol rate of 512 KSym/sec, providing a bit rate of 2048 Kbits/sec on average. The propagation environment has been assumed to be microcellular so that ISI is insignificant. It can be seen that there is a significant improvement in the performance of the adaptive over the fixed modem at all SNRS, and that this improvement is enhanced with increasing SNR.

Figure 7:
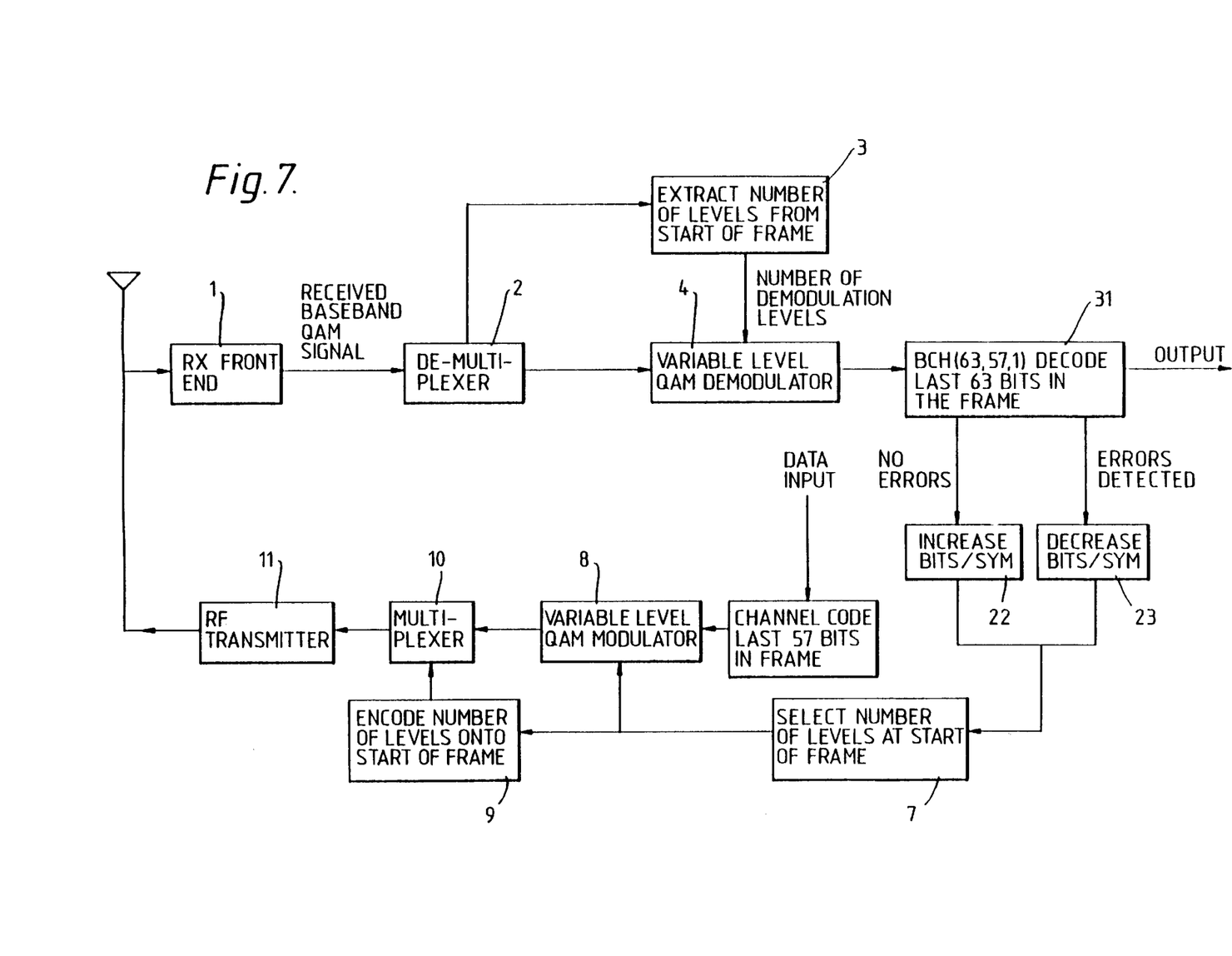
FIG. 7 illustrates schematically a radio transceiver according to a preferred embodiment of the invention.

Rather than switching the QAM levels on RSSI this switching can be done on the command of a channel codec, in this case a systematic BCH codec. FIG. 7 shows a simplified block diagram of the BER switching transceiver. In FIG. 7, parts in common with the transceiver of FIG. 3 have like numerals. The transceiver of FIG. 7 differs from the transceiver of FIG. 3 in that the receiver part the output of demodulator 4 is provided to a BCH decoder 31. The BCH decoder 31 provides a "no errors" output to decision unit 22, and an "errors detected" output to decision unit 23. Decision units 22, 23 control level selection unit 7 appropriately. Further, in the transmitter part of the transceiver of FIG. 7 the input data stream passes through channel coder 24 before being supplied to QAM modulator 8.

Figure 8:
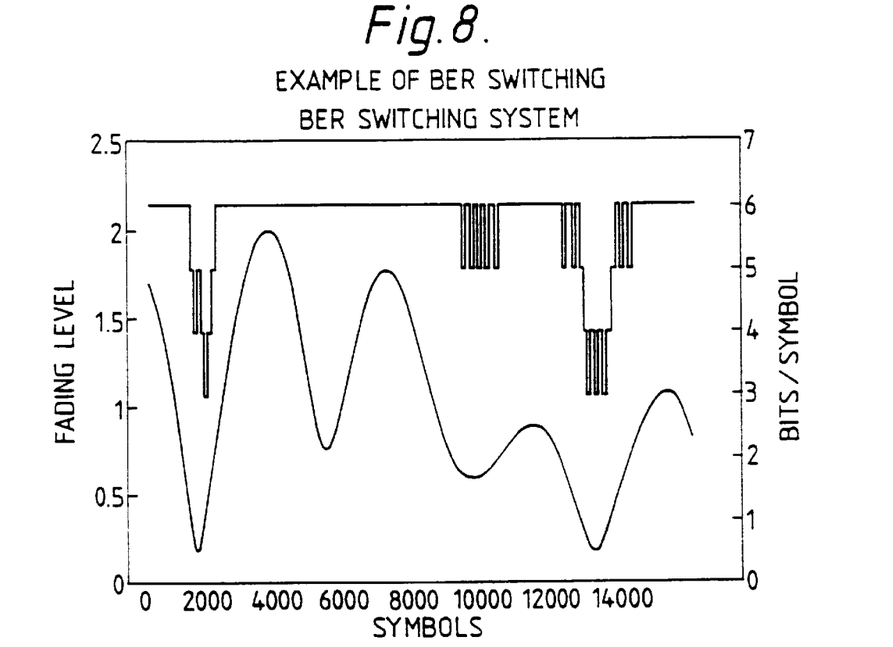
FIG. 8 shows a graph illustrating variation of bits/symbol with fading level.

In order to obtain an estimate of the channel during each received data packet, a BCH(63,57,1) code is overlaid onto the last 57 bits of input data in each block. The input data may already have been channel coded and interleaved using the same system as described in the previous section, the additional coding is overlaid onto whatever data was present. This codec was generally ineffective at correcting errors as it was overwhelmed by the non-interleaved errors in a typical error burst, but it informed the receiver that channel conditions were poor. Such a coding system involved little overhead as it was only applied to the final 57 bits in a block which contained an average of 400 bits. The coded data was applied to the adaptive QAM modulator and the modulated output was up-converted and transmitted. The QAM demodulation was performed using the number of QAM levels extracted from the header, as described in the section on the RSSI switched QAM system. Most of the data was passed to the output where it might be subjected to de-interleaving and channel decoding. However, the final 63 bits of the recovered bit stream were passed through the BCH(63,57,1) codec 21 before proceeding to the output. If no errors were detected by this BCH codec then the number of QAM levels used in the next block was doubled, otherwise they were halved. Switching profiles for the same section of channel as used in FIGS. 4 and 5 are shown in FIG. 8. Again a channel SNR of 30 dB was used. This figure shows the BER switched system had a similar level switching profile to the variable throughput RSS system, as might be expected. The lack of hysteresis on level switching is evident but it does not cause any additional signalling overhead, nor significantly alter the BER.

Figure 9:
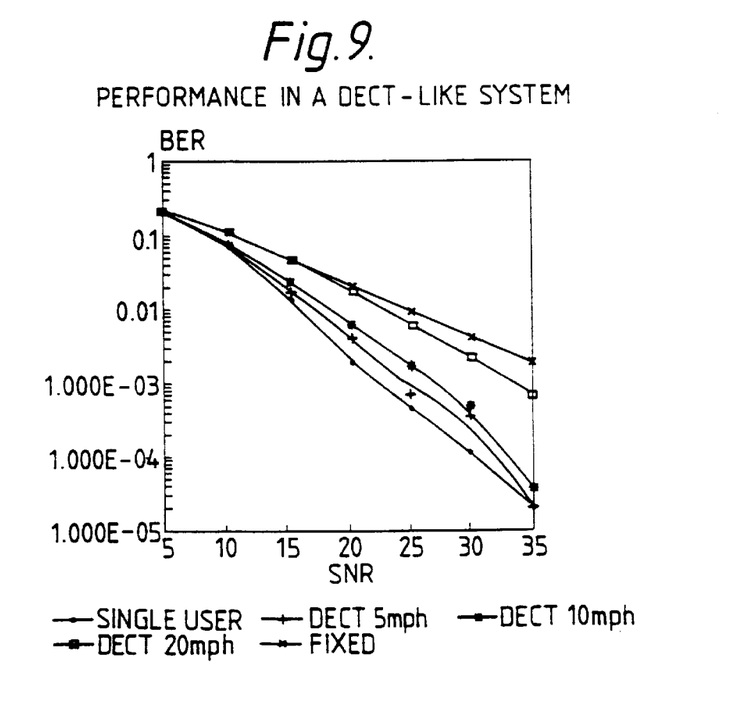
FIG. 9 shows a graph illustrating performance of a DECT-like system.

The digital European cordless telecommunications (DECT) system uses TDD, supporting 12 channels per carrier. The 12 down-link and 12 up-link channels constitute a 24 slot frame lasting 10 ms. Each time-slot containing a packet has a duration of 0.417 ms. The data in the packet consists of 320 bits which are transmitted at 1152 kSym/s. In a simulation each bit was replaced by a QAM symbol to increase system capacity. The header informed the receiver of the number of constellation points. The RSSI switching system was employed. FIG. 9 shows the variation of BER as a function of channel SNR for this DECT-like system for MSs travelling at different speeds. No co-channel interference was present. The DECT framing meant that the transmission and reception were separated by 12 slots or 5 ms, and consequently the channel could occasionally experience considerable changes between transmission and reception of data and therefore generate an inappropriate number of levels. When the MS travelled faster the BER deteriorated and when the mobile's speed was 20 mph the adaptive and the fixed four-level QAM had similar performances. However, an order of magnitude improvement in BER was achieved for a given channel SNR in excess of 20 dB when the mobile's speed was decreased from 20 to 5 mph. This was due to the slower fading rate making the channel estimation more accurate. An adaptive Star QAM modem for transmission of data over Rayleigh fading channels using a variable number of modulation levels has been proposed. Criteria for deciding how to vary the number of modulation levels to give a required performance characteristic are presented. The adaptive QAM modem can be arranged to provide a near constant BER over a wide range of channel SNRs, although the bit rate may vary considerably. This type of performance is suitable for data services that can tolerate some delay. In general, the adaptive modem provides the flexibility to vary both the BER and the bit rate in a prescribed manner to suit a particular application. The adaptive modems have a better performance than the fixed modems both with and without co-channel interference.

While the invention has described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim:

1. A radio system comprising a pair of stations at least one of which has a radio transceiver having;
   a radio receiver for receiving signals from the other station;
   means for assessing a quality of the received radio signals;
   means for selecting a transmission modulation state on the basis of the assessment of the quality of the received signals;
   a radio transmitter for transmitting signals to the other station using a modulation scheme having a plurality of modulation states;
   means for adjusting the transmitting state of the radio transmitter to be the selected modulation state; and
   signalling means for including in the signals to be transmitted to the other station an indication of the selected modulation state.

2. A radio system as claimed in claim 1 wherein the signalling means has means for adjusting the modulation state of the radio transmitter to transmit the indication of the selected modulation state in a predetermined one of the modulation states.

3. A radio system as claimed in claim 1 wherein the radio system operates using time division duplex operation.

4. A radio system as claimed in claim 1, wherein the modulation scheme of the transmitter is quadrature amplitude modulation.

5. A radio system as claimed in claim 1 wherein the means for assessing the quality of the received radio signals assess either or both the received signal strength or bit error rate of those signals.

6. A radio system as claimed in claim 1 wherein each station has a said radio transceiver.

7. A radio transceiver for the transmission and reception of digital signals wherein a transmitter of the transceiver varies the number of binary digits encoded onto each symbol for transmission in accordance with measured received signal strength, the measured bit error rate (BER) or some combination of these which are received by a receiver of said transceiver.

8. A radio transceiver comprising a transmitter and a receiver wherein the signal strength received by said receiver is averaged over a predetermined time period and the number of bits/symbol to be used in subsequent transmissions by said transmitter is determined according to this average.

9. A radio transceiver comprising a transmitter and a receiver wherein errors in decoded digital signals received by said receiver are identified using an error detection system, and the number of bits/symbol to be used in subsequent transmissions by said transmitter is based on the number and distribution of the errors detected.

10. A radio system according to claim 1 wherein the radio communication is bi-directional but instantaneously uni-directional, and said signals comprise data placed in packets or blocks wherein the initial symbols in each block are reserved for signalling the number of bits/symbol used in the block.

11. A radio transceiver comprising:
    a radio receiver for receiving radio signals;
    means for assessing a quality of the received radio signals;
    means for selecting a transmission modulation state on the basis of the assessment of the quality of the received signals;
    a radio transmitter for transmitting signals using a modulation scheme having a plurality of modulation states;
    means for adjusting the transmitting state of the radio transmitter to be the selected modulation state; and
    signalling means for including in the signals to be transmitted an indication of the selected modulation state.

* * * * *